United States Patent [19]

Hoffman

[11] Patent Number: 5,062,912
[45] Date of Patent: Nov. 5, 1991

[54] METHOD AND APPARATUS FOR FABRICATING A SEAMLESS HOLLOW RUBBER CORE FOR A BALL

[76] Inventor: Allan C. Hoffman, 2891 Rumsey Dr., Riverside, Calif. 92506

[21] Appl. No.: 597,892

[22] Filed: Oct. 15, 1990

[51] Int. Cl.$^5$ .............................................. B29C 35/52
[52] U.S. Cl. .................................... 156/145; 156/155; 156/245; 156/292; 156/500; 273/58 B; 273/58 J; 273/61 C
[58] Field of Search ............... 156/145, 146, 147, 155, 156/245, 500, 292; 264/DIG. 44, 221; 273/58 B, 58 J, 61 C

[56] References Cited

U.S. PATENT DOCUMENTS

| | | | |
|---|---|---|---|
| 720,482 | 2/1903 | Richards | 264/DIG. 44 |
| 1,969,128 | 8/1934 | Harrison | 156/155 |
| 2,294,424 | 9/1942 | Roberts | 273/61 |
| 2,453,143 | 11/1948 | Lejeune | 273/61 |
| 2,706,514 | 4/1955 | Anderson | 156/155 |
| 2,786,007 | 3/1957 | Chew | 156/155 |
| 3,424,226 | 1/1969 | Steele | 249/85 |
| 3,907,949 | 9/1975 | Carlson | 264/6 |
| 3,921,953 | 11/1975 | Diener | 249/62 |
| 4,239,568 | 12/1980 | Takazawa | 156/155 |
| 4,853,057 | 8/1989 | Hoffmann | 156/147 |

Primary Examiner—Caleb Weston
Attorney, Agent, or Firm—Poms, Smith, Lande & Rose

[57] ABSTRACT

A seamless hollow rubber core for a tennis ball is formed within a spherical cavity of a mold, wherein the spherical cavity has a diameter commensurate with the outside diameter of the core. A spherical surface is formed from a material which has a melting temperature above the curing temperature of the rubber compound used for the core. The spherical surface is dimensioned commensurately with the inside diameter of a core. The spherical surface is then mounted within the mold concentrically with the spherical cavity. Unsured rubber core preforms are placed about the spherical surface in intimate contact with the spherical cavity. The core performs are then heated to a curing temperature. During the curing process, the preforms meld to form the seamless core. The core just formed is then heated to the melting temperature of the material of the spherical surface so that the spherical surface melts thereby leaving molten within the core. The molten material may then be removed from the inside of the core such as by draining it through a small orifice formed therein.

15 Claims, 3 Drawing Sheets

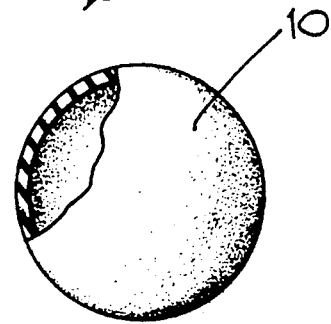
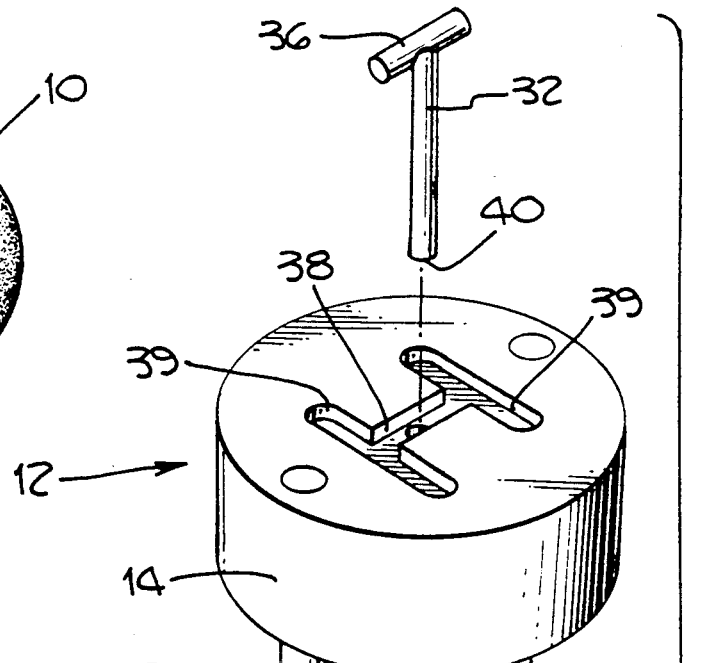
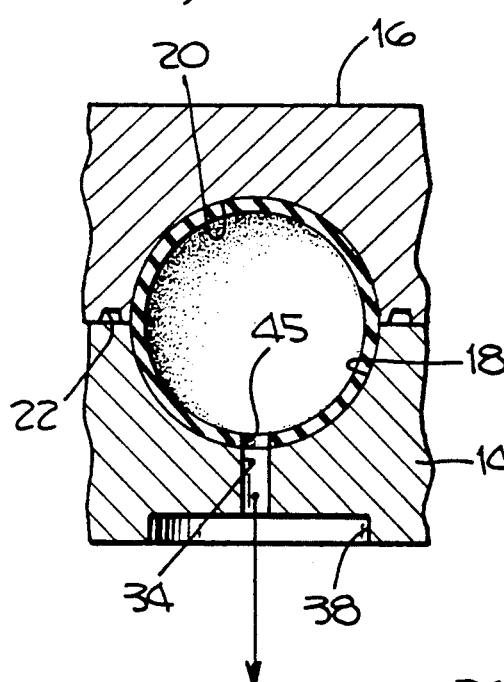
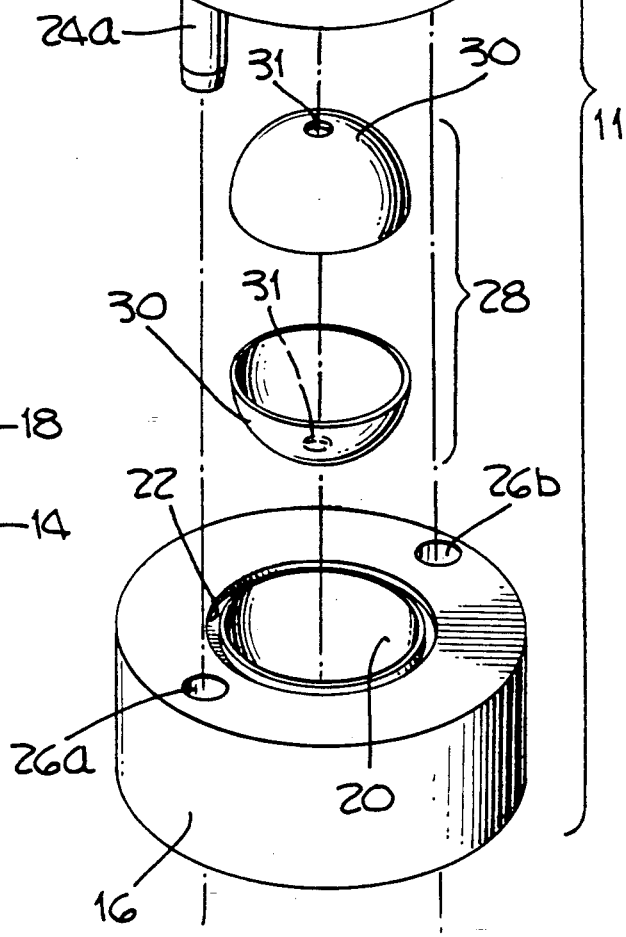

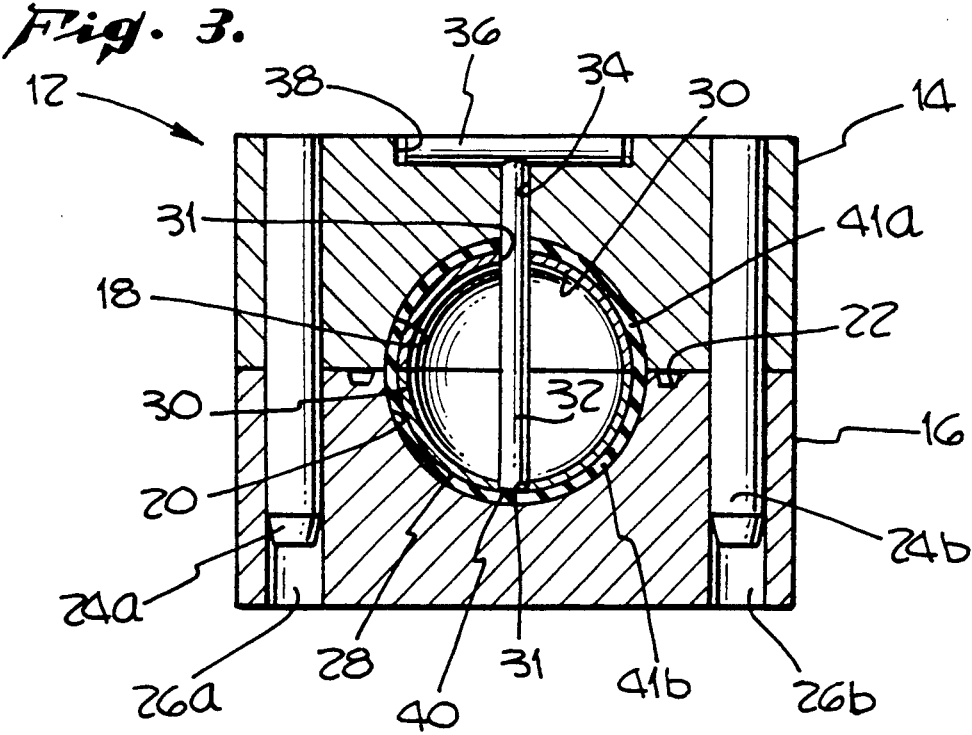
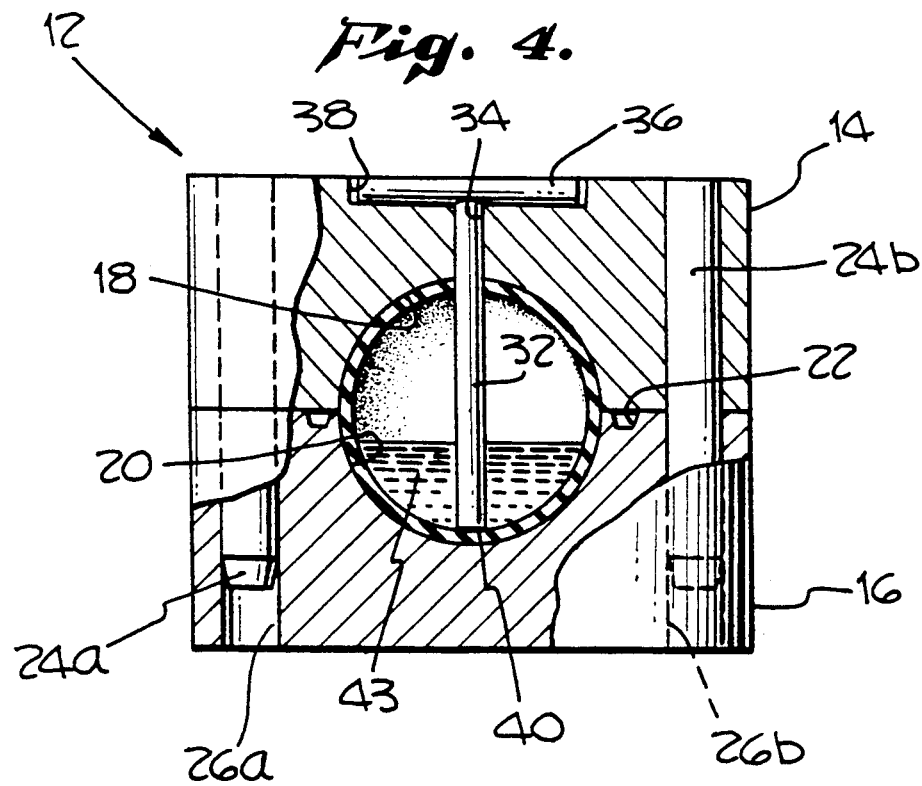

METHOD AND APPARATUS FOR FABRICATING A SEAMLESS HOLLOW RUBBER CORE FOR A BALL

FIELD OF THE INVENTION

The present invention relates generally to the manufacture of tennis balls, and more particularly to an apparatus and method for fabricating a seamless hollow rubber core for tennis balls.

BACKGROUND OF THE INVENTION

The art of manufacturing tennis balls has been well developed heretofore by such companies as Dunlop Rubber Company, Limited, of London, England as shown by its U.S. Pat. Nos. 4,151,029 and 4,248,658 and Great Britain Patent No. 436,100. The elastomeric core of a tennis ball is usually made of vulcanized rubber molded into a pair of hemispherical rubber cups which are then adhered together by a heat curable cement. The core is heat treated to bond the hemispherical rubber cups to one another before the fabric cover is applied.

Since tennis balls are internally pressurized to provide a desired bounce characteristic, the core halves are assembled in a pressurized environment so that a suitable internal pressure, on the order of 17 lbs. per square inch, is provided within the core during its initial manufacture. When the core is subjected to the adhesive heat curing step, the mass of air within the core tends to expand the core against the surrounding heat applying mold. It is thus necessary to allow the mold and core to cool sufficiently after a core curing steps so that the core will not blow apart under the elevated internal pressure caused by the heated mass of air contained therein. Furthermore, the pressurized core subjected to a second heating step when the fabric cover is bonded to the core. A method of making tennis balls as set forth above is fully described in applicant's U.S. Pat. No. 4,853,057.

To avoid pressurizing the core during manufacture, a one way air valve may also be provided in the core. Generally, during manufacture the core is only partially pressurized and the fabric cover placed therein. Air may be introduced through the one way valve through the fabric covering after manufacture, thereby reducing the chance of core damage caused by excessive pressure built up within the core during heating. Such a method of making a pressurized ball is disclosed in applicant's U.S. Pat. No. 4,765,853.

In each of the above patents, it is noted that the core is formed by cementing two core halves together. The cemented core halves are then subjected to a cement curing step to bond each half to each other. It would highly desirable to provide a seamless hollow core to eliminate this step.

SUMMARY OF THE INVENTION

It is an object of the present invention to provide a method to fabricate a seamless hollow core for tennis balls or the like. It is also an object of the present invention to provide a novel apparatus for fabricating such cores.

According to the present invention, a seamless hollow rubber core for a tennis ball is formed within a spherical cavity of a mold, wherein the spherical cavity has a diameter commensurate with the outside diameter of the core. A spherical surface is formed from a material which has a melting temperature above the curing temperature of the rubber compound used for the core. The spherical surface is dimensioned commensurately with the inside diameter of a core. The spherical surface is then mounted within the mold concentrically with the spherical cavity. Uncured rubber core preforms are placed about the spherical surface in intimate contact with the spherical cavity. The core performs are then heated to a curing temperature. During the curing process, the preforms melt to form the seamless core. The core just formed is then heated to the melting temperature of the material of the spherical surface so that the spherical surface melts thereby leaving molten material within the core. The molten material may then be removed from the inside of the core such as by draining it through a small orifice formed therein. The orifice may then be plugged by a one way air valve to facilitate pressurization of the core.

In another aspect of the present invention, the one way air valve may be formed in the seamless core during the curing process. The valve allows for pressurization of the core, after the orifice, through which the molten material is drained, has been plugged.

These and other objects, advantages and features of the present invention will become readily apparent to those skilled in the art from a study of the following Description of Exemplary Preferred Embodiments when read in conjunction with the attached Drawing and appended Claims.

BRIEF DESCRIPTION OF THE DRAWING

FIG. 1 is a broken view, partially in cross-section, of a seamless core for a tennis ball constructed according to the principles of the present invention;

FIG. 2 is an exploded view of a novel apparatus used to construct the seamless core of FIG. 1;

FIG. 3 illustrates in cross section, the apparatus of FIG. 2 assembled with uncured rubber core performs;

FIG. 4 is a view similar to FIG. 2 showing an intermediate process step after curing of the seamless core with the molten material in the core;

FIG. 5 is a view similar to FIG. 4 showing a subsequent process step after removal of the molten material;

DESCRIPTION OF EXEMPLARY PREFERRED EMBODIMENTS

Figure 6:
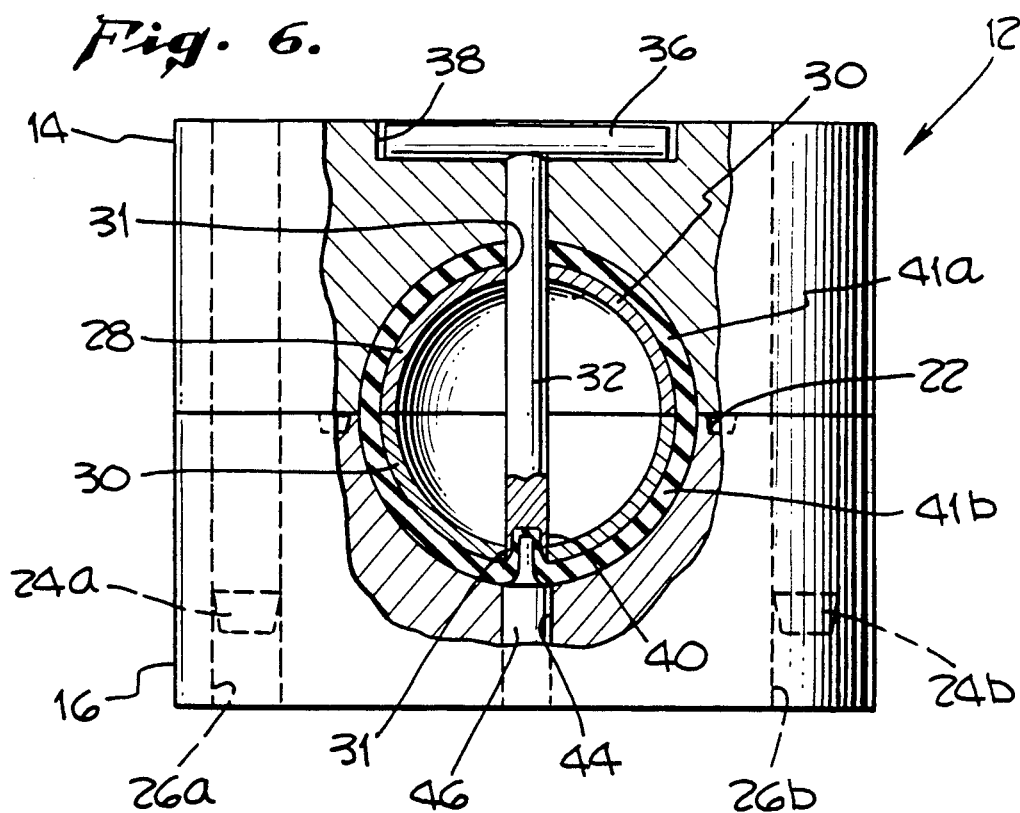
FIG. 6 is a view similar to FIG. 3 illustrating an alternative embodiment of the present invention wherein a one way air valve is formed unilaterally with the seamless core during the curing thereof.

Referring now to FIG. 1, there is shown a seamless core 10 for a tennis ball (not shown) constructed in accordance with the principles of the present invention. The method and apparatus used to fabricate the core 10 is described fully hereinbelow. Generally, the core 10 is formed by curing 65 +/−5 Durometer Shore A tennis ball compound provided by Dunlop Sports Company, Greenville South Carolina. Of course, other suitable compounds may be used. In initial preparation, the compound is first mixed on a rubber mill and then sheeted off the mill with a thickness of 0.200 inches. The sheeted off compound is then formed into two disk-shaped preforms, wherein each preform is 3.300 inches in diameter cut from a flat sheet of the compound. A 0.25 inside diameter hole is cut in the center of one of the preforms, for reasons which will become apparent hereinbelow.

Referring now to FIG. 2, there is shown an apparatus 11 for constructing the seamless core 10. The apparatus 11 includes a mold 12 having a first mold half 14 and a second mold half 16. The first mold half 14 has a hemispherical cavity 18 and the second mold half 16 has a hemispherical cavity 20. Furthermore, the second mold half 16 has an annular channel 22 surrounding its hemispherical cavity 20. The annular channel 22 collects rubber flash during the molding process. The first mold half 14 carries a pair of alignment pins 24a, 24b. The second mold half 16 has a pair of bores 26a, 26b wherein each of the bores are dimensioned to receive a respective one of the alignment pins 24a, 24b when the mold is closed. When the mold 12 is closed, each spherical cavity 18, 20 is in opposition to each other such that a spherical cavity is formed as best seen in FIGS. 3-5. The spherical cavity has a diameter commensurate with the outside diameter of the core 10.

The apparatus 11 further includes a spherical surface 28. The spherical surface 28 is formed from a material which has a melting temperature above the curing temperature of the rubber compound being used to form the core 10. The spherical surface 28 further is dimensioned to have a diameter commensurate with the inside diameter of the core 10.

More particularly, a spherical surface 28 is formed from a pair of die cast solder hemispherical surfaces 30. The solder used is preferably 58% bismuth and 42% tin and would have a melting temperature of 281° F. Each of these hemispherical melting tempera surfaces 30 has an opening 31, the purpose of which is described below. When the surface 28 is mounted, as described immediately hereinbelow, within the molding apparatus 12, a gap is formed between it and the spherical cavity. The uncured rubber preforms are then placed within this gap for subsequent curing to form the seamless core !0.

To mount the spherical surface 28 within the spherical cavity, a T-shaped alignment pin 32 is received through a bore 34 within the first mold half 14. The bore 34 is coaxially aligned with a diameter of the spherical cavity. The pin 32 has a length sufficient to extend substantially through the spherical cavity when the mold apparatus 12 is closed. With the pin 32 fully inserted through the bore 34, the spherical surface 28 is mounted to the pin 32. The pin 32 is received through each opening 31 of the hemispherical surfaces 30 with sufficient engagement thereto to allow insertion but prevent movement of the spherical surface during the curing. The length of the pin 32 is further dimensioned so that its end 40 is flush with the spherical surface 8 when it is concentric within the spherical cavity.

To remove and insert the pin 32, it has a handle portion 36 which is received within a channel 38 on the first mold half 14. A pair of lateral channels 39 are provided so that the handle portion 36 may be conveniently gripped.

Referring now to FIGS. 3-5, the process steps of fabricating the core 10 are described. With the mold 12 open, the pin 32 is inserted through the bore 34 to project through the hemispherical cavity 18 of the first mold half 14. A first preform 41a, being the above described preform having the hole therein, is then placed in the spherical cavity 18 with the pin 32 being received through its hole. The spherical surface 28 is then mounted to the pin 32 through its openings 31 as described above. A second preform 41b is then placed over the spherical surface 28. The second mold half 16 is then secured to the first mold half 14. The resulting core assembly is best seen in FIG. 3.

The uncured rubber preforms are then elevated to a temperature of 270° F. and held for eight minutes to cure the rubber to form the core 10. After eight minutes, the mold temperature is increased to 310° F. and maintained for twenty minutes to enable the solder of the spherical surface 28 to melt, as best seen at 43 in FIG. 4. After twenty minutes, the mold 12 is opened and the pin 32 is removed. The mold is then inverted, as best seen in FIG. 5, to permit the solder to flow from within the core 10 through the opening 45 formed by the pin 32, such opening 45 being originally present in the preform 41a. The mold 12 is then separated and the finished core 10 extracted. A one way air valve (not shown) may then be bonded within the opening 45 as disclosed in applicant's U.S. Pat. No. 4,240,630.

An advantage of the present invention is that the pin 32 can be reinserted into the mold 12 to tool it for the next cycle and further that the solder may also be re-used to cast further hemispherical surfaces 30. In one aspect of the present invention, the mold 12 and the removable pin 32 may be preheated to 270° F. prior to the initiation of the above described process.

Figure 7:
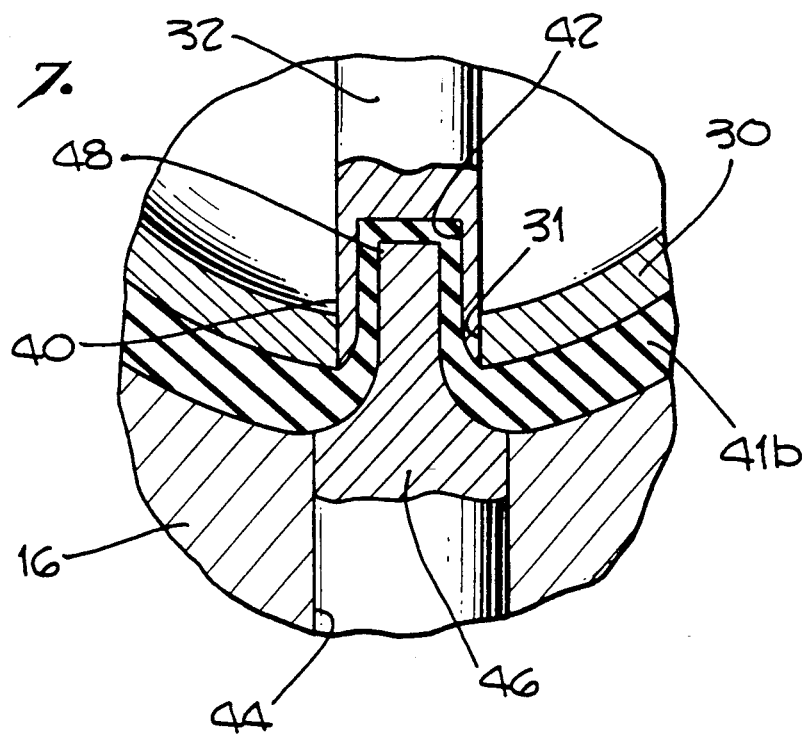
FIG. 7 is an enlarged view of a detail of FIG. 6.

Referring now to FIG. 6 and FIG. 7, there is shown an alternative embodiment of the present invention. The end 40 of the pin 32 has a bore 42 therein. A corresponding bore 44 is formed in the second mold half 16. A plug 46 is received within the bore 44 and has a reduced diameter portion 48 which extends into the bore 42. Uncured rubber of the second preform 41b surrounds the reduced diameter portion 48 within the bore 42. The rubber compound around the reduced diameter potion, when cured as part of the seamless core 10, may then be split to form a one way air valve as described in applicant's U.S. Pat. 4,327,912 or U.S. Pat. No. 4,765,853. The opening 45 in the core 10 may then be plugged by known bonding or cementing techniques.

There has been described hereinabove a novel apparatus and techniques for forming a seamless hollow core for a tennis ball. It is apparent that those skilled in the art may now make numerous uses of and departures from the above described exemplary preferred embodiment without departing from the inventive concepts disclosed herein. Accordingly, the present invention is to be described solely by the scope of the following claims.

I claim:

1. A method for fabricating a seamless hollow rubber core for a ball comprising steps of:

providing a mold having a first mold half and a second mold half, each of said first mold half and said second mold half having a hemispherical cavity in opposition to each other such that a spherical cavity is formed when said mold is closed, such spherical cavity being dimensioned commensurately with an outside diameter of said core;

forming a spherical surface from a material which has a melting temperature above a curing temperature of rubber used for said core, said spherical surface being dimensioned commensurately with an inside diameter of said core;

forming a pair of matching core preforms of uncured rubber;

placing said pair of uncured rubber core preforms about said spherical surface to form a core assembly;

mounting said core assembly within said spherical cavity;

heating said core preforms to said curing temperature for a time sufficient to cure said core preforms, said core being formed during such curing;

heating said core to said melting temperature such that such spherical surface melts whereby molten material remains within said core; and removing said molten material from said core.

2. A method as set forth in claim 1 wherein said forming step includes the substeps of:

forming a pair of matching hemispherical surfaces from said material; and mounting said hemispherical surfaces to each other to form said spherical surface.

3. A method as set forth in claim 1 wherein said step of forming a pair of core preforms includes the substeps of:

forming each of said pair of matching core preforms of a flat disk-shaped configuration; and placing said pair of disk-shaped core preforms in opposing relationship about said spherical surface.

4. A method as set forth in claim 1 wherein said core assembly mounting step includes the substeps of:

inserting an alignment pin through a bore in said first mold half wherein said alignment pin extends substantially through said spherical cavity;

forming an opening in said spherical surface and forming a corresponding hole in one of said core preforms, said opening and said hole being dimensioned to received said pin; and mounting said assembly to said pin through said opening in said spherical surface and said hole in said one of said core preforms.

5. A method as set forth in claim 1 wherein said core reforms heating step includes the substeps of:

heating said core performs to 270° F.; and maintaining such temperature for eight minutes.

6. A method as set forth in claim 1 wherein said core heating step includes the substeps of:

heating such core to 310° F.; and maintaining said temperature for twenty minutes.

7. A method as set forth in claim 1 wherein said removing step includes the substeps of:

forming an opening through said core; and draining said molten material from said core though said opening.

8. A method as set forth in claim 7 further comprising the steps of:

inserting a one way air valve into said opening to air seal said core; and introducing air under pressure into said core through said valve to pressurize said core.

9. A method for fabricating a seamless hollow rubber core for a ball comprising steps of:

providing a mold having a first mold half and a second mold half, each of said first mold half and said second mold half having a hemispherical cavity in opposition to each other such that a spherical cavity is formed when said mold is closed, such spherical cavity being dimensioned commensurately with an outside diameter of said core;

forming a spherical surface from a material which has a melting temperature above a curing temperature of rubber used for used core, said spherical surface being dimensioned commensurately with an inside diameter of said core;

placing uncured rubber core preforms about said spherical surface to form a core assembly;

mounting said core assembly within said spherical cavity wherein said core assembly mounting step includes the substeps of:

inserting an alignment pin through a bore in said first mold half wherein said alignment pin extends substantially through said spherical cavity, forming an opening in said spherical surface and forming a corresponding hole in one of said core preforms, said opening and said hole being dimensioned to received said pin and mounting said assembly to said pin through said opening in said spherical surface and said hole in said one of said core preforms;

heating said core preforms to said curing temperature for a time sufficient to cure said core preforms, said core being formed during such curing;

heating said core to said melting temperature such that such spherical surface melts whereby molten material remains within said core; and removing said molten material from said core.

10. An apparatus for fabricating a seamless hollow rubber core for a ball comprising:

a mold including a first mold half and a second mold half, each of said first mold half and said second mold half having a hemispherical cavity in opposition to each other such that a spherical cavity is formed when said mold is closed, said spherical cavity being dimensioned commensurately with an outside diameter of said core;

a spherical surface of a material which has a melting temperature above the curing temperature of rubber, said spherical surface being dimensioned commensurately with an inside diameter of said core; and means for mounting said spherical surface concentrically within said spherical cavity such that a gap remains to receive uncured rubber preforms which when cured form said core wherein said mounting means includes:

an alignment pin, said first mold half having a bore communicating with said hemispherical cavity thereof to receive said pin, said pin when inserted into said bore extending substantially through said spherical cavity, said spherical surface further having a first opening through which said pin is received in slidable engagement to mount said spherical surface within said spherical cavity.

11. An apparatus as set forth in claim 10, wherein said spherical surface further has a second opening to receive an end of said pin.

12. An apparatus as set forth in claim 11 wherein said first opening and said second opening are disposed along a diameter of said spherical surface.

13. An apparatus as set forth in claim 11 wherein said end of said pin has a coaxial bore to receive uncured rubber therein, said second mold half having a bore therethrough coaxial aligned with said coaxial bore of said pin, said second mold half having a plug received through said bore thereof, said plug having a reduced diameter portion to be received within said coaxial bore and surrounded by said uncured rubber to form a valve unitary with said core after curing thereof.

14. A method for fabricating a seamless rubber core for a ball comprising:

providing a mold having a first mold half and a second mold half, each of said first mold half and said second half having a hemispherical cavity in opposition to each other such that a spherical cavity if formed when said mold is closed, said spherical cavity being dimensioned commensurately with an outside diameter of said core, said first mold half having a bore disposed therein coaxial with the diameter of said spherical cavity;

placing an alignment pin through said bore, said pin having a length sufficient to extend substantially through said spherical cavity when said mold is closed;

placing a first uncured core preform within said hemispherical cavity of said first mold half, said first uncured core preform having an opening therethrough to receive said pin;

placing spherical surface within said first uncured core preform, said spherical surface having an opening through which said pin is received, said spherical surface having a diameter commensurate with an inside diameter of said core and being formed from a material which has a melting temperature above a curing temperature;

placing said second uncured core perform on said spherical surface;

placing said second mold half over said second core preform to close said mold;

heating each core preform to a curing temperature to form said seamless core, said pin leaving an opening within said core;

heating said core above said curing temperature to a temperature sufficient to melt said spherical surface; and removing molten shown material from said core through said opening within said core.

15. A method as set forth in claim 14 further comprising the steps of:

insterting a one way air valve into said opening to air seal said core; and introducing air under pressure into said core through said valve to pressurize said core.

* * * * *

UNITED STATES PATENT AND TRADEMARK OFFICE
CERTIFICATE OF CORRECTION

PATENT NO. : 5,062,912
DATED : Nov. 5, 1991
INVENTOR(S) : Allan C. Hoffman

It is certified that error appears in the above—identified patent and that said Letters Patent is hereby corrected as shown below:

In the Abstract, line 10, "Unsured" should be — Uncured —

Signed and Sealed this

Eleventh Day of May, 1993

Attest:

MICHAEL K. KIRK

*Attesting Officer*     *Acting Commissioner of Patents and Trademarks*